(12) United States Patent
Ota et al.

(10) Patent No.: US 11,994,312 B2
(45) Date of Patent: May 28, 2024

(54) AIR-CONDITIONING APPARATUS

(71) Applicant: Mitsubishi Electric Corporation, Tokyo (JP)

(72) Inventors: Yasushi Ota, Tokyo (JP); Yoshiyuki Takashima, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 320 days.

(21) Appl. No.: 17/629,842

(22) PCT Filed: Oct. 31, 2019

(86) PCT No.: PCT/JP2019/042801
§ 371 (c)(1),
(2) Date: Jan. 25, 2022

(87) PCT Pub. No.: WO2021/084686
PCT Pub. Date: May 6, 2021

(65) Prior Publication Data
US 2022/0275958 A1 Sep. 1, 2022

(51) Int. Cl.
*F24F 11/58* (2018.01)
*G06T 5/50* (2006.01)

(52) U.S. Cl.
CPC ............... *F24F 11/58* (2018.01); *G06T 5/50* (2013.01)

(58) Field of Classification Search
CPC .............. F24F 11/58; F24F 11/88; G06T 5/50
See application file for complete search history.

(56) References Cited

U.S. PATENT DOCUMENTS

2010/0157860 A1 6/2010 Hagiwara et al.
2010/0298982 A1* 11/2010 Chamorro .............. G05B 13/00
62/507

(Continued)

FOREIGN PATENT DOCUMENTS

JP 2004-077063 A 3/2004
JP 2008-004975 A 1/2008

(Continued)

OTHER PUBLICATIONS

Examination Report dated Oct. 18, 2022 issued in corresponding IN Patent Application No. 202227023882 (and English translation).

(Continued)

*Primary Examiner* — Mohammad Ali
*Assistant Examiner* — Vincent W Chang
(74) *Attorney, Agent, or Firm* — POSZ LAW GROUP, PLC (57) ABSTRACT

An air-conditioning apparatus includes a refrigerant circuit, a thermal imaging sensor acquiring thermal information on an air-conditioned room, and a wireless LAN communication unit including an interface board connector and a wireless LAN interface. The interface board connector connects to an operation information signal line, through which operation information on the refrigerant circuit is transferred, and a thermal-imaging-sensor information signal line, through which thermal-imaging-sensor information based on the thermal information on the air-conditioned room acquired by the thermal imaging sensor is transferred. The wireless LAN interface separately transmits the operation information, transferred through the operation information signal line connected to the interface board connector, and the thermal-imaging-sensor information, transferred through the thermal-imaging-sensor information signal line (Continued)

connected to the interface board connector, to an external electronic device.

6 Claims, 7 Drawing Sheets

(56) References Cited

U.S. PATENT DOCUMENTS

| | | | | |
|---|---|---|---|---|
| 2015/0204556 A1* | 7/2015 | Kusukame | ......... | B60H 1/00742 |
| | | | | 250/338.3 |
| 2016/0072553 A1 | 3/2016 | Tanji | | |
| 2016/0320085 A1* | 11/2016 | Silawan | ................. | F24F 11/526 |
| 2018/0367658 A1 | 12/2018 | Endo | | |
| 2019/0212025 A1* | 7/2019 | Martin | .................... | F24F 11/49 |
| 2019/0305825 A1 | 10/2019 | Tanji | | |
| 2019/0331358 A1* | 10/2019 | Ritmanich | ............... | F24F 11/46 |
| 2021/0239534 A1* | 8/2021 | Shayne | .................... | F24F 11/80 |

FOREIGN PATENT DOCUMENTS

| | | |
|---|---|---|
| JP | 2009-290896 A | 12/2009 |
| JP | 2016054460 A | 4/2016 |
| JP | 2019-004414 A | 1/2019 |
| KR | 20-0419750 Y1 | 6/2006 |

OTHER PUBLICATIONS

International Search Report dated Jan. 7, 2020, issued in corresponding International Patent Application No. PCT/JP2019/042801 (and English Machine Translation).

* cited by examiner

(A) INITIAL POSITION (B1) ONE-TIME DRIVING FROM START POSITION (B2) IN DRIVING (C) END POSITION

FIG. 7

FIG. 8

AIR-CONDITIONING APPARATUS

CROSS REFERENCE TO RELATED APPLICATION

This application is a U.S. National Stage Application of International Application No. PCT/JP2019/042801, filed on Oct. 31, 2019, the contents of which are incorporated herein by reference.

TECHNICAL FIELD

The present disclosure relates to an air-conditioning apparatus that transmits information on a room image-captured by a thermal imaging sensor to an external electronic device.

BACKGROUND ART

In recent years, an air-conditioning apparatus which includes an indoor unit including a drivable thermal imaging sensor and a wireless local area network (LAN) communication unit has been known. The wireless LAN communication unit of the air-conditioning apparatus transmits thermal-imaging-sensor information, which is based on thermal information on an air-conditioned room acquired by the thermal imaging sensor, to a server linked to a network. The server performs a process on the basis of the transmitted thermal-imaging-sensor information to generate thermal image information on the room and accumulates the generated information. A user can determine conditions of the room by referring to the thermal image information accumulated in the server through a mobile terminal, for example. Furthermore, the air-conditioning apparatus transmits operation information on, for example, a refrigerant circuit of the air-conditioning apparatus, in addition to the thermal-imaging-sensor information to an external device. The operation information and the thermal-imaging-sensor information are large-volume data.

A known communication device segments large-volume data and then transmits the segmented data to an external device.

CITATION LIST

Patent Literature

Patent Literature 1: Japanese Unexamined Patent Application Publication No. 2019-4414

SUMMARY OF INVENTION

Technical Problem

Information that is transmitted from an air-conditioning apparatus to an external device includes operation information on, for example, a refrigerant circuit, as well as thermal-imaging-sensor information based on thermal information acquired by a thermal imaging sensor. The volume of operation information and that of thermal-imaging-sensor information have recently been growing. In particular, thermal information acquired by a thermal imaging sensor has a relatively large volume.

In transmitting such large-volume information containing operation information and thermal-imaging-sensor information based on thermal information in such a manner that the operation information and the thermal-imaging-sensor information are segmented and transmitted by using a technique disclosed in Patent Literature 1, segmentation requires much time, resulting in longer communication time for the thermal-imaging-sensor information. Unfortunately, longer transmission time for the thermal-imaging-sensor information leads to lower responsiveness of thermal image information that a user refers to.

In response to the above issue, it is an object of the present disclosure to provide an air-conditioning apparatus that can improve the speed of communication of thermal-imaging-sensor information.

Solution to Problem

An air-conditioning apparatus according to an embodiment of the present disclosure includes a refrigerant circuit in which a compressor, a load side heat exchanger, an expansion valve, and a heat source side heat exchanger are connected by pipes through which refrigerant is circulated, a thermal imaging sensor configured to acquire thermal information on an air-conditioned room, and a wireless LAN communication unit including an interface board connector and a wireless LAN interface. The interface board connector connects to an operation information signal line, through which operation information on the refrigerant circuit is transferred, and a thermal-imaging-sensor information signal line, through which thermal-imaging-sensor information based on the thermal information on the air-conditioned room acquired by the thermal imaging sensor is transferred. The wireless LAN interface is configured to separately transmit the operation information, transferred through the operation information signal line connected to the interface board connector, and the thermal-imaging-sensor information, transferred through the thermal-imaging-sensor information signal line connected to the interface board connector, to an external electronic device.

Advantageous Effects of Invention

According to the embodiment of the present disclosure, the operation information and the thermal-imaging-sensor information are separately transferred to the wireless LAN interface through the operation information signal line and the thermal-imaging-sensor information signal line, respectively. The wireless LAN interface separately transmits the operation information and the thermal-imaging-sensor information based on the thermal information. This allows sequential transmission of thermal-imaging-sensor information in response to reception of the thermal-imaging-sensor information without segmenting the thermal-imaging-sensor information and operation information. This improves the speed of communication of thermal-imaging-sensor information. The improved speed of communication of thermal-imaging-sensor information leads to higher responsiveness of thermal image information that a user refers to.

DESCRIPTION OF EMBODIMENTS

Air-conditioning apparatuses according to embodiments will be described below with reference to the drawings. The same components in the figures are designated by the same reference signs in the following description, and a repeated description will be given only when necessary.

Embodiment 1

Figure 1:
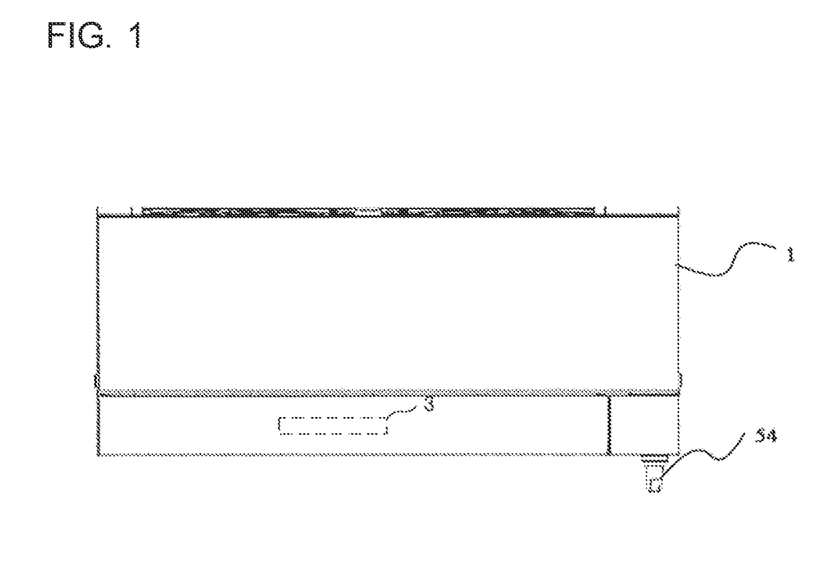
FIG. 1 is a diagram illustrating the appearance of an indoor unit of an air-conditioning apparatus according to Embodiment 1.

FIG. 1 is a diagram illustrating the appearance of an indoor unit 1 of an air-conditioning apparatus according to Embodiment 1.

As illustrated in FIG. 1, the indoor unit 1 of the air-conditioning apparatus incudes a thermal imaging sensor 54, which is a diode sensor that acquires thermal information on an air-conditioned room and is controlled so that it is rotatably driven.

The indoor unit 1 further includes therein a wireless LAN communication unit 3 that transmits thermal-imaging-sensor information based on thermal information on the air-conditioned room acquired by the thermal imaging sensor 54 to an external device. The thermal-imaging-sensor information will be described in detail later.

Figure 2:
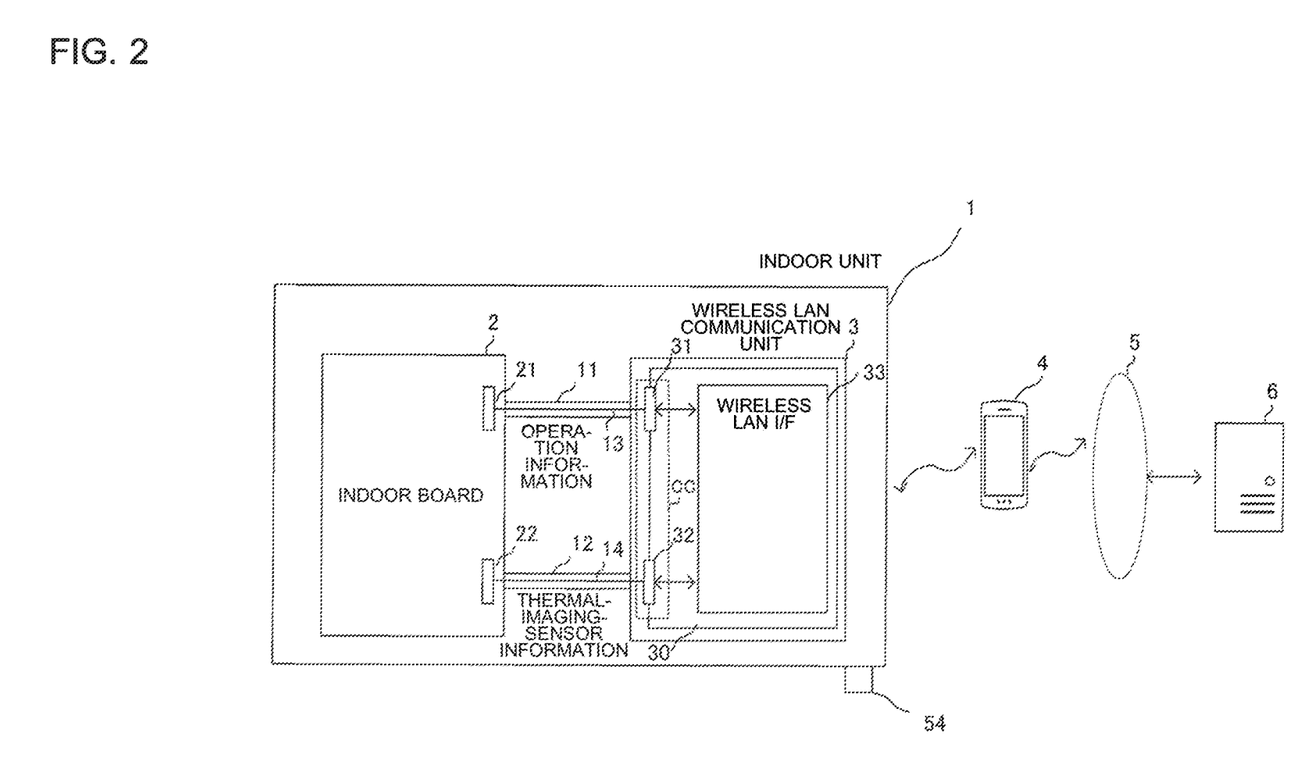
FIG. 2 is a diagram illustrating the relationship between an indoor board and a wireless LAN interface board of a wireless LAN communication unit in the indoor unit of the air-conditioning apparatus according to Embodiment 1.

FIG. 2 is a diagram illustrating the relationship between an indoor board 2 and a wireless LAN interface board 30 of the wireless LAN communication unit 3 (refer to FIG. 2), which will be described later, in the indoor unit 1 of the air-conditioning apparatus according to Embodiment 1.

As illustrated in FIG. 2, the indoor board 2 in the indoor unit 1 of the air-conditioning apparatus has a first indoor board connector 21 and a second indoor board connector 22.

The first indoor board connector 21 connects to an operation information signal line 13 to transfer operation information on the air-conditioning apparatus. The operation information on the air-conditioning apparatus is, for example, operation information on a refrigerant circuit of the air-conditioning apparatus. Examples of the operation information on the refrigerant circuit include pieces of information representing an operating frequency of a compressor, a discharge temperature of the compressor, a switching state of a refrigerant flow switching device, a state of an outdoor fan, and a state of an indoor fan. The operation information may contain, for example, information on a temperature detected by an indoor temperature sensor and a temperature detected by an outdoor temperature sensor, remote control setting information on the air-conditioning apparatus, and time information. The operation information signal line 13 is sheathed in a first cable 11.

The second indoor board connector 22 connects to a thermal-imaging-sensor information signal line 14 to transfer thermal-imaging-sensor information associated with the air-conditioning apparatus. The thermal-imaging-sensor information is based on thermal information on the air-conditioned room acquired by the thermal imaging sensor 54 of the air-conditioning apparatus. The thermal-imaging-sensor information may contain, for example, information on a temperature detected by the indoor temperature sensor and a temperature detected by the outdoor temperature sensor and time information. The thermal-imaging-sensor information signal line 14 is sheathed in a second cable 12.

The wireless LAN communication unit 3 includes the wireless LAN interface board 30. The wireless LAN interface board 30 has a first interface board connector 31, a second interface board connector 32, and a wireless LAN interface 33.

The first interface board connector 31 connects to the operation information signal line 13. The operation information transferred through the operation information signal line 13 is inputted to the wireless LAN interface 33.

The second interface board connector 32 connects to the thermal-imaging-sensor information signal line 14. The thermal-imaging-sensor information transferred through the thermal-imaging-sensor information signal line 14 is inputted to the wireless LAN interface 33. The first interface board connector 31 and the second interface board connector 32 may be replaced by a single interface board connector CC. In this case, the operation information signal line 13 and the thermal-imaging-sensor information signal line 14 are connected to the single interface board connector CC. A cable covering the operation information signal line 13 and the thermal-imaging-sensor information signal line 14 connected to the interface board connector CC bifurcates into two parts, a first part connecting to the first indoor board connector 21 and a second part connecting to the second indoor board connector 22.

The wireless LAN interface 33 separately transmits the operation information, transferred through the operation information signal line 13 connected to the first interface board connector 31, and the thermal-imaging-sensor information, transferred through the thermal-imaging-sensor information signal line 14 connected to the second interface board connector 32, to a smartphone 4, which is an external device, via a wireless LAN network. A router may be provided in addition to the smartphone 4, and the smartphone 4 may be used as an operating device.

The speed of transfer of the thermal-imaging-sensor information to the wireless LAN interface 33 through the thermal-imaging-sensor information signal line 14 is higher than that of the operation information transferred to the wireless LAN interface 33 through the operation information signal line 13. For example, the serial peripheral interface (SPI) is used to transmit the thermal-imaging-sensor information. A different communication method whose communication speed is lower than that of the SPI communication is used for transmission through the operation information signal line 13.

The smartphone 4, which serves as a router of the wireless LAN network and an operating terminal, is linked to the Internet 5 via an access point (not illustrated) in a public line. A server 6 is linked to the Internet 5. In other words, the indoor unit 1 can communicate with the smartphone 4 and the server 6 via the wireless LAN communication unit 3.

The thermal-imaging-sensor information and the operation information transmitted from the indoor unit 1 to the smartphone 4 is inputted to the server 6 via the Internet 5. The server 6 performs a predetermined process, which will be described later, on the inputted thermal-imaging-sensor information and stores the processed information as thermal image information. Furthermore, the server 6 stores the inputted operation information and outputs the operation information to the smartphone 4.

Figure 3:
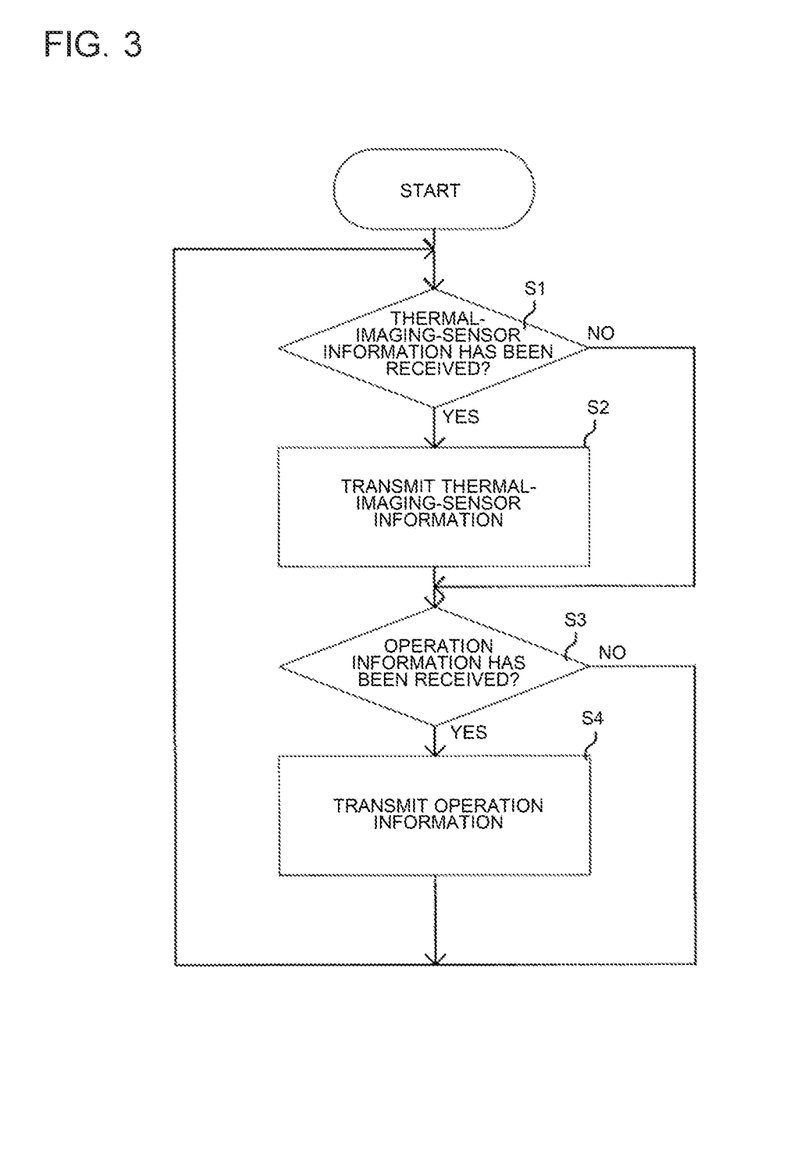
FIG. 3 is a flowchart illustrating a process of transmitting thermal-imaging-sensor information and operation information through the wireless LAN interface of the air-conditioning apparatus according to Embodiment 1.

FIG. 3 is a flowchart illustrating a process of transmitting thermal-imaging-sensor information and operation information through the wireless LAN interface 33 in the indoor unit 1 of the air-conditioning apparatus according to Embodiment 1.

Referring to FIG. 3, the wireless LAN interface 33 determines whether thermal-imaging-sensor information has been received (S1). When determining in step S1 that thermal-imaging-sensor information has been received (YES in S1), the wireless LAN interface 33 transmits the thermal-imaging-sensor information to the smartphone 4 (S2). After the thermal-imaging-sensor information is transmitted in step S2, the process proceeds to step S3.

If the wireless LAN interface 33 determines in step S1 that thermal-imaging-sensor information has not been received (NO in S1), the process proceeds to step S3. In step S3, the wireless LAN interface 33 determines whether operation information has been received. If the wireless LAN interface 33 determines in step S3 that operation information has not been received (NO in S3), the process returns to step S1.

If the wireless LAN interface 33 determines in step S3 that thermal-imaging-sensor information has been received (YES in S3), the wireless LAN interface 33 transmits the operation information to the smartphone 4 (S4). Then, the process returns to step S1. The transmission of operation information in step S4 is performed at predetermined time intervals, such as every five minutes. In other words, the wireless LAN interface 33 separately transmits thermal-imaging-sensor information and operation information to the smartphone 4.

Figure 4:
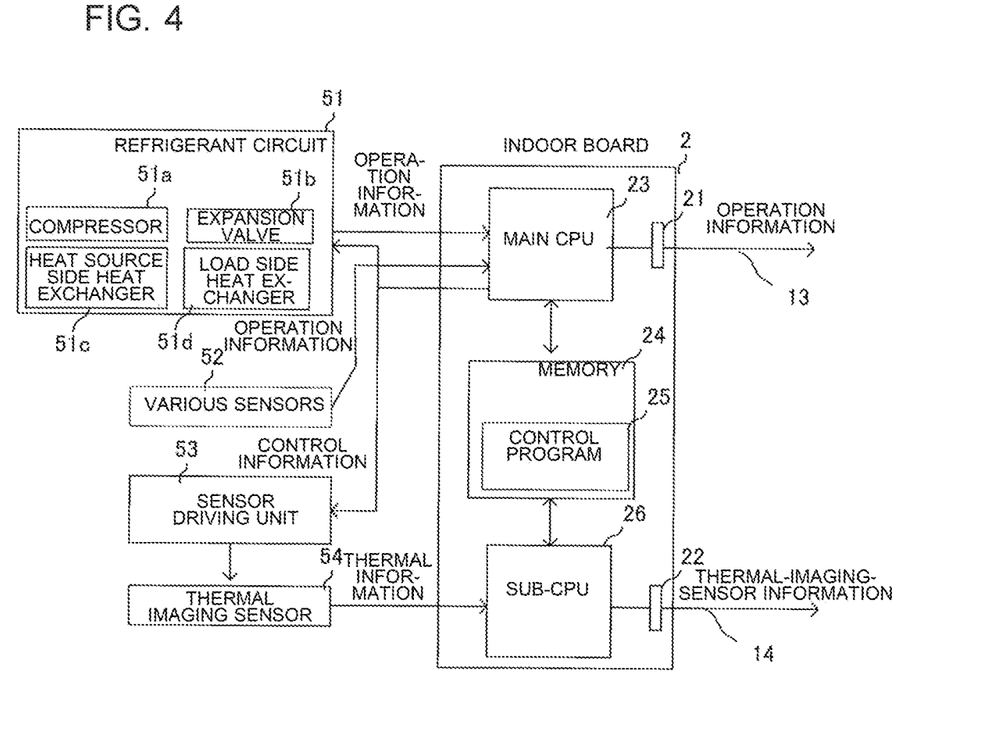
FIG. 4 is a diagram illustrating the indoor board in the indoor unit of the air-conditioning apparatus according to Embodiment 1.

FIG. 4 is a diagram illustrating the indoor board 2 in the indoor unit 1 of the air-conditioning apparatus according to Embodiment 1. As illustrated in FIG. 4, the single indoor board 2 includes thereon the first indoor board connector 21, the second indoor board connector 22, a main central processing unit (CPU) 23, a memory 24, and a sub-CPU 26.

The main CPU 23 cooperates with a control program 25 stored in the memory 24 to control the entire air-conditioning apparatus. The main CPU 23 receives operation information from, for example, a refrigerant circuit 51 and various sensors 52. The refrigerant circuit 51 is a circuit in which at least a compressor 51a, an expansion valve 51b, a heat source side heat exchanger 51c, and a load side heat exchanger 51d are connected by pipes through which refrigerant is circulated. The main CPU 23 outputs the received operation information to the wireless LAN interface board 30 of the wireless LAN communication unit 3 through the operation information signal line 13. Furthermore, the main CPU 23 outputs control information to the refrigerant circuit 51 and a sensor driving unit 53. The sensor driving unit 53 drives the thermal imaging sensor 54 to acquire thermal information on the air-conditioned room.

The memory 24 stores the control program 25, thermal information from the thermal imaging sensor 54, and operation information from, for example, the refrigerant circuit 51 and the various sensors 52, and is also used as a work area.

The sub-CPU 26 cooperates with the control program 25 stored in the memory 24 to perform a process of converting thermal information from the thermal imaging sensor 54 into thermal-imaging-sensor information. The thermal-imaging-sensor information is a single thermal image of the air-conditioned room that is based on the thermal information acquired by the thermal imaging sensor 54. Specifically, the thermal imaging sensor 54 is driven several times to acquire pieces of thermal information on the air-conditioned room, and the pieces of thermal information acquired by the thermal imaging sensor 54 are converted into thermal-imaging-sensor information that represents a single thermal image. The sub-CPU 26 outputs the thermal-imaging-sensor information, obtained based on the thermal information, to the wireless LAN interface board 30 of the wireless LAN communication unit 3 through the thermal-imaging-sensor information signal line 14. If the latest thermal-imaging-sensor information is acquired prior to transmission of the preceding thermal-imaging-sensor information because the preceding thermal-imaging-sensor information fails to be transmitted in a timely manner, the thermal-imaging-sensor information in the memory 24 will be replaced by the latest thermal-imaging-sensor information, and the latest thermal-imaging-sensor information will be transmitted.

The sub-CPU 26 may be dedicated hardware. The sub-CPU 26 may be, for example, a single circuit, a composite circuit, an application specific integrated circuit (ASIC), a field programmable gate array (FPGA), or a combination thereof. Functional parts that the sub-CPU 26 implements may be implemented by individual hardware components or may be implemented by a single hardware component.

Figure 5:
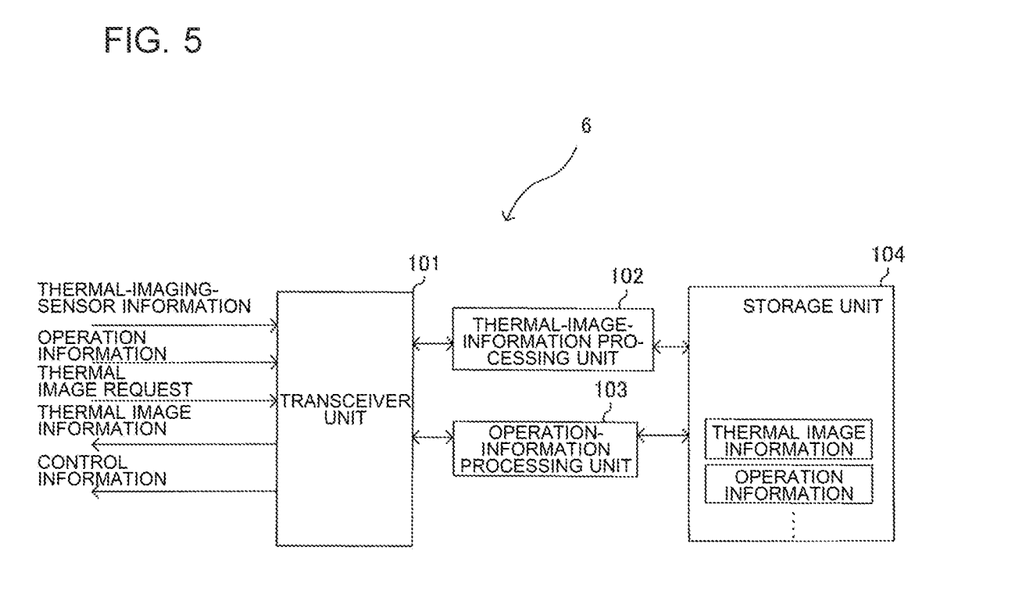
FIG. 5 is a functional block diagram illustrating functions of a server that stores thermal-imaging-sensor information associated with the air-conditioning apparatus according to Embodiment 1.

FIG. 5 is a functional block diagram illustrating functions of the server 6 storing thermal-imaging-sensor information associated with the air-conditioning apparatus according to Embodiment 1.

As illustrated in FIG. 5, the server 6 includes a transceiver unit 101, a thermal-image-information processing unit 102, an operation-information processing unit 103, and a storage unit 104.

The transceiver unit 101 receives, for example, thermal-imaging-sensor information and operation information from the wireless LAN communication unit 3 in the indoor unit 1 and a thermal image request from the smartphone 4. Furthermore, the transceiver unit 101 transmits thermal image information to the smartphone 4 in response to the thermal image request, and transmits control information based on the operation information to the wireless LAN communication unit 3 in the indoor unit 1 via the smartphone 4, serving as a router.

The thermal-image-information processing unit 102 performs a predetermined process on the basis of thermal-imaging-sensor information from the wireless LAN communication unit 3 to convert the thermal-imaging-sensor information into thermal image information. The predetermined process involves, for example, combining thermal-imaging-sensor information and a camera-captured image of an air-conditioned room. The thermal-image-information processing unit 102 stores the obtained thermal image information to the storage unit 104. When receiving a thermal image request, the thermal-image-information processing unit 102 acquires thermal-imaging-sensor information associated with the request from a memory (not illustrated) of the wireless LAN communication unit 3 via the Internet 5 and the smartphone 4. Then, the thermal-image-information processing unit 102 converts the associated thermal-imaging-sensor information acquired from the wireless LAN communication unit 3 into thermal image information, and the transceiver unit 101 transmits the thermal image information to the smartphone 4.

The operation-information processing unit 103 stores operation information from the wireless LAN communication unit 3 to the storage unit 104 and transmits the operation information to the smartphone 4 via the Internet 5. The smartphone 4 displays the operation information from the server 6, and transmits information on a user operation to the indoor unit 1 via the wireless LAN communication unit 3.

A method of acquiring thermal information through the thermal imaging sensor 54 will now be described.

Figure 6:
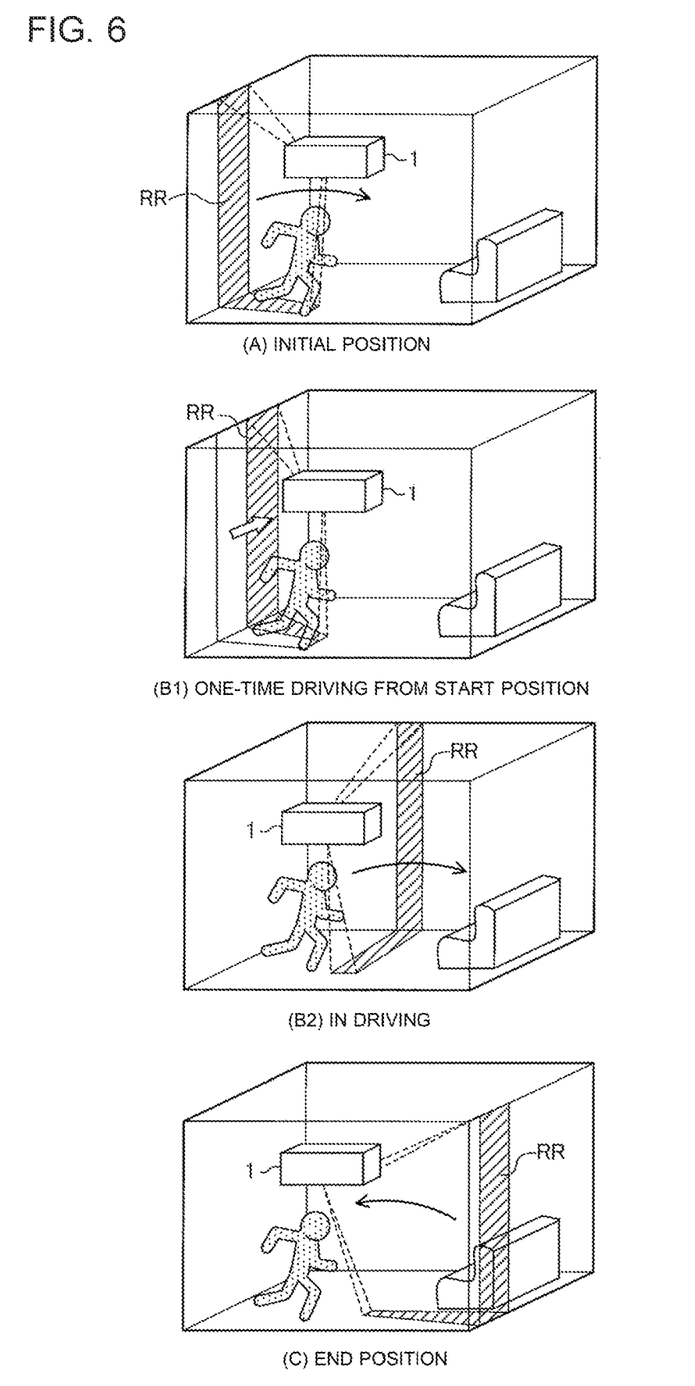
FIG. 6 includes diagrams illustrating a detection target area of a thermal imaging sensor of the air-conditioning apparatus according to Embodiment 1 in an air-conditioned room.

FIG. 6 includes diagrams illustrating a detection target area RR of the thermal imaging sensor 54 of the air-conditioning apparatus according to Embodiment 1 in an air-conditioned room. In FIG. 6, each hatched portion represents the detection target area RR where the thermal imaging sensor 54 can acquire temperature information, an open arrow represents the direction of movement of the thermal imaging sensor 54 driven the first time from an initial position, and each black arrow represents the direction of driving the thermal imaging sensor 54.

To display a thermal image on the smartphone 4, the sub-CPU 26 causes the thermal imaging sensor 54 to be driven to the initial position and causes light from the thermal imaging sensor 54 to be directed to the initial position. FIG. 6(A) illustrates the thermal imaging sensor 54 with light directed to the initial position. For the initial position, for example, the sensor is driven and rotated to the leftmost position, where temperature information can be acquired, of the air-conditioned room. The leftmost position is a limit position of a range where light from the thermal imaging sensor 54 is not applied to the indoor unit 1. A driving amount by which the thermal imaging sensor 54 is driven to this position is predetermined. The thermal imaging sensor 54 is driven and rotated based on the driving amount.

Then, the sub-CPU 26 acquires thermal information from the thermal imaging sensor 54 and stores the acquired thermal information in the memory 24. After that, the sub-CPU 26 determines whether thermal information on the entire room has been acquired.

Whether thermal information on the entire room has been acquired is determined as follows. For example, assuming that the initial position of the thermal imaging sensor 54 is the leftmost position, whether the thermal imaging sensor 54 driven and rotated has reached the rightmost position, where thermal information can be acquired, of the room as illustrated in FIG. 6(C) is determined. Like the initial position, the rightmost position is a limit position of the range where light from the thermal imaging sensor 54 is not applied to the indoor unit 1. A driving amount by which the thermal imaging sensor 54 is driven to the rightmost position or the number of times the thermal imaging sensor 54 is driven until the sensor reaches the rightmost position is stored in the memory 24 in advance. Whether the thermal imaging sensor 54 has reached that position is determined based on the driving amount or the number of times, thus determining whether thermal information on the entire room has been acquired.

If the sub-CPU 26 determines that thermal information on the entire room has not been acquired, the sub-CPU 26 causes the thermal imaging sensor 54 to be driven and rotated a predetermined amount. For a rotational driving amount, the thermal imaging sensor 54 is driven and rotated in such a manner that, for example, as illustrated in FIG. 6(B1), there is at least no gap between the preceding detection target area and a detection target area of interest to which light from the thermal imaging sensor 54 is applied. A rotational driving amount for one time is stored in the memory 24 in advance. After the sensor is driven, the sub-CPU 26 again acquires thermal information and stores the acquired thermal information to the memory 24.

After that, while the thermal imaging sensor 54 is driven and rotated from the left to the right as illustrated in FIG. 6(B2), thermal information is repeatedly acquired and stored to the memory 24 until thermal information on the entire room is acquired.

If the sub-CPU 26 determines that thermal information on the entire room has been acquired, the sub-CPU 26 combines pieces of thermal information, associated with multiple areas, stored in the memory 24 into thermal-imaging-sensor information representing a single thermal image. The sub-CPU 26 outputs the thermal-imaging-sensor information representing a single thermal image to the thermal-imaging-sensor information signal line 14.

After that, the sub-CPU 26 causes the thermal imaging sensor 54 to be driven to the initial position and again acquires thermal information. In Embodiment 1, the sub-CPU 26 causes the thermal imaging sensor 54 to be returned to the initial position after transmission of thermal-imaging-sensor information.

In Embodiment 1, the sub-CPU 26 causes the thermal imaging sensor 54 to be driven and rotated from the leftmost position illustrated in FIG. 6(A) to the rightmost position illustrated in FIG. 6(C) and then causes the thermal imaging sensor 54 to be returned to the leftmost position. The thermal imaging sensor 54 may be driven and rotated in another manner. After transmission of thermal-imaging-sensor information follows arrival of the thermal imaging sensor 54 at the rightmost position, the sub-CPU 26 may cause the thermal imaging sensor 54 to be driven and rotated from the rightmost position to the leftmost position by a predetermined amount for each driving to acquire thermal information.

Figure 7:
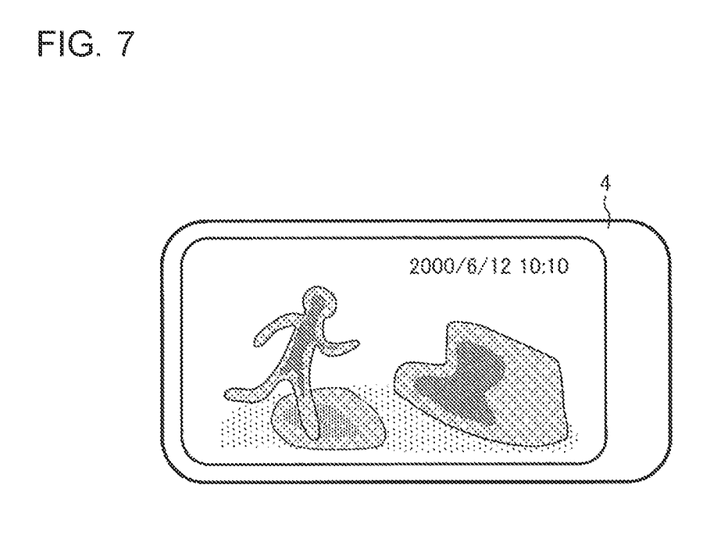
FIG. 7 is a diagram illustrating an exemplary thermal image, which is displayed on a smartphone, of a room air-conditioned by the air-conditioning apparatus according to Embodiment 1.

FIG. 7 is a diagram illustrating an exemplary thermal image, which is displayed on the smartphone 4, of a room air-conditioned by the air-conditioning apparatus according to Embodiment 1. As illustrated in FIG. 7, thermal image information displayed on the smartphone 4 may contain, in addition to the thermal image, date and time information and a camera-captured image of the air-conditioned room such that these pieces of information are combined. The thermal image information may be generated by an application program in the smartphone 4.

In the air-conditioning apparatus according to Embodiment 1, operation information and thermal-imaging-sensor information are separately transferred to the wireless LAN interface 33 through the operation information signal line 13 and the thermal-imaging-sensor information signal line 14, respectively. This allows sequential transmission of thermal-imaging-sensor information without segmenting the thermal-imaging-sensor information and operation information. This improves the speed of communication of thermal-imaging-sensor information.

In addition, thermal-imaging-sensor information is transferred by a method whose communication speed is higher than that of a method by which operation information is transferred. This further improves the speed of communication of thermal-imaging-sensor information. The improved communication speed of thermal-imaging-sensor information leads to higher responsiveness of thermal image information that the user refers to.

Embodiment 2

Figure 8:
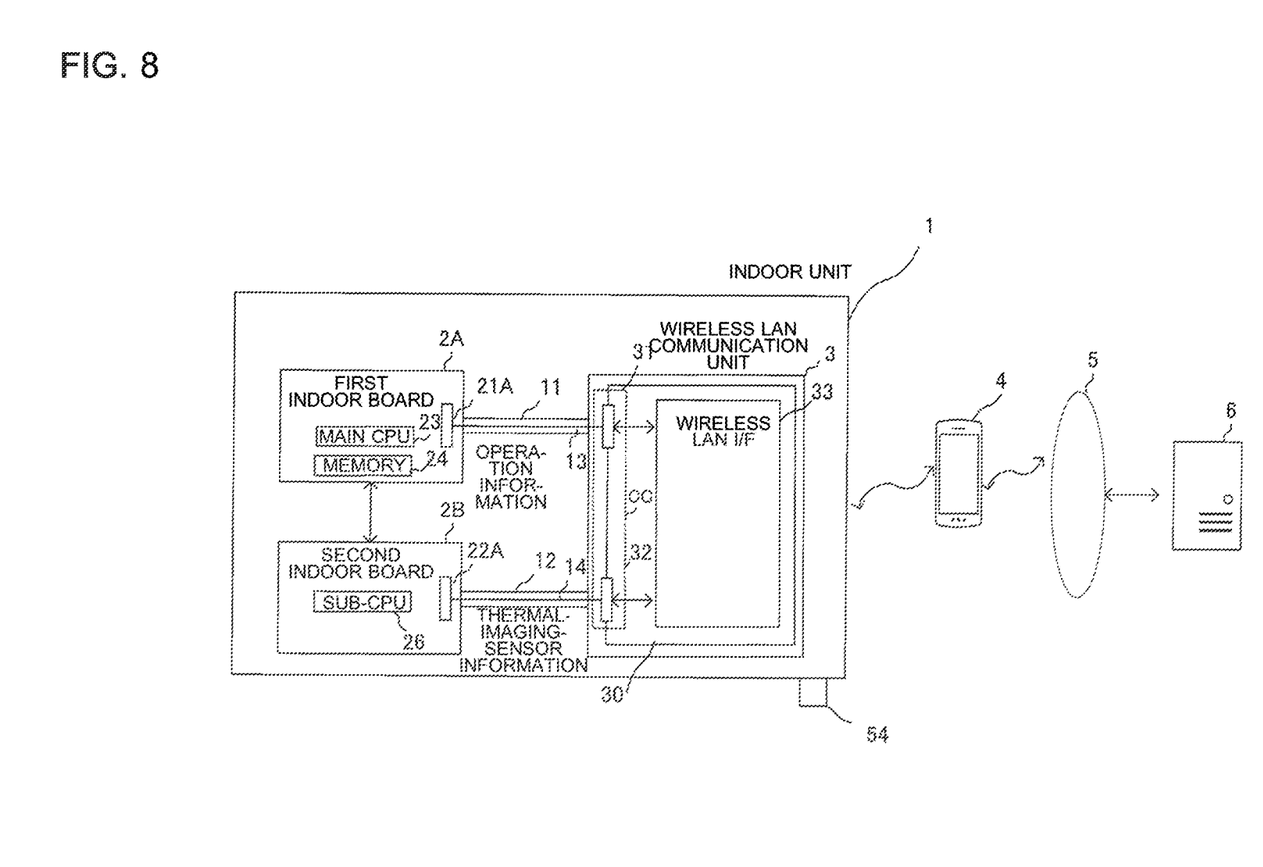
FIG. 8 is a diagram illustrating the relationship between a first indoor board, a second indoor board, and the wireless LAN interface board of the wireless LAN communication unit in an indoor unit of an air-conditioning apparatus according to Embodiment 2.

FIG. 8 is a diagram illustrating the relationship between a first indoor board 2A, a second indoor board 2B, and the wireless LAN interface board 30 of the wireless LAN communication unit 3 in an indoor unit 1 of an air-conditioning apparatus according to Embodiment 2.

Embodiment 2 differs from Embodiment 1 illustrated in FIG. 2 in that the wireless LAN communication unit 3 is connected to the first indoor board 2A and the second indoor board 2B instead of the single indoor board 2.

The first indoor board 2A has thereon the main CPU 23 and the memory 24, which are illustrated in FIG. 4. The second indoor board 2B has thereon the sub-CPU 26, which is illustrated in FIG. 4. The main CPU 23 and the sub-CPU 26 operate as in Embodiment 1. The first indoor board 2A has a first indoor board connector 21A. The second indoor board 2B has a second indoor board connector 22A. In other words, operation information is inputted from the first indoor board 2A to the wireless LAN interface 33 through the operation information signal line 13. Thermal-imaging-sensor information is inputted from the second indoor board 2B to the wireless LAN interface 33 through the thermal-imaging-sensor information signal line 14.

The first cable 11 and the second cable 12 may be replaced by a bifurcated cable that covers the operation information signal line 13 and the thermal-imaging-sensor information signal line 14 and branches into two parts in proximity to the first indoor board connector 21A and the second indoor board connector 22A. Such a bifurcated cable allows the first indoor board 2A, the second indoor board 2B, and the wireless LAN interface board 30 to be connected by a single cable.

The embodiments have been presented by way of example only, and are not intended to limit the scope of the embodiments. The embodiments can be embodied in a variety of other forms. Various omissions, substitutions, and changes of the embodiments can be made without departing from the spirit and scope of the embodiments. These embodiments and modifications should be considered to fall within the spirit and scope of the embodiments.

REFERENCE SIGNS LIST

1: indoor unit, 2: indoor board, 2A: first indoor board, 2B: second indoor board, 3: wireless LAN communication unit, 4: smartphone, 5: the Internet, 6: server, 11: first cable, 12: second cable, 13: operation information signal line, 14: thermal-imaging-sensor information signal line, 21, 21A: first indoor board connector, 22, 22A: second indoor board connector, 23: main CPU, 24: memory, 25: control program, 26: sub-CPU, 30: wireless LAN interface board, 31: first interface board connector, 32: second interface board connector, 33: wireless LAN interface, 51: refrigerant circuit, 51a: compressor, 51b: expansion valve, 51c: heat source side heat exchanger, 51d: load side heat exchanger, 52: various sensors, 53: sensor driving unit, 54: thermal imaging sensor, 101: transceiver unit, 102: thermal-image-information processing unit, 103: operation-information processing unit, 104: storage unit, RR: detection target area, CC: interface board connector

The invention claimed is:

1. An air-conditioning apparatus comprising:
a refrigerant circuit in which a compressor, a load side heat exchanger, an expansion valve, and a heat source side heat exchanger are connected by pipes through which refrigerant is circulated;
a thermal imaging sensor configured to acquire thermal information on an air-conditioned room; and
a wireless local area network (LAN) communication unit including an interface board connector and a wireless LAN interface, the interface board connector connecting to an operation information signal line, through which operation information on the refrigerant circuit is transferred, and a thermal-imaging-sensor information signal line, through which thermal-imaging-sensor information based on the thermal information on the air-conditioned room acquired by the thermal imaging sensor is transferred, the wireless LAN interface being configured to separately transmit the operation information, transferred through the operation information signal line connected to the interface board connector, and the thermal-imaging-sensor information, transferred through the thermal-imaging-sensor information signal line connected to the interface board connector, to an external electronic device.

2. The air-conditioning apparatus of claim 1, further comprising:
an indoor board having a first indoor board connector connecting to the operation information signal line, a main central processing unit (CPU) connected to the first indoor board connector and configured to transfer the operation information on the refrigerant circuit to the wireless LAN interface through the operation information signal line, a second indoor board connector connecting to the thermal-imaging-sensor information signal line, and a sub-CPU connected to the second indoor board connector and configured to transfer, as the thermal-imaging-sensor information representing a thermal image, the thermal information on the air-conditioned room acquired by the thermal imaging sensor to the wireless LAN interface.

3. The air-conditioning apparatus of claim 1, further comprising:
a first indoor board having a first indoor board connector connecting to the operation information signal line and a main CPU connected to the first indoor board connector, the main CPU being configured to transfer the operation information on the refrigerant circuit to the wireless LAN interface through the operation information signal line; and
a second indoor board having a second indoor board connector connecting to the thermal-imaging-sensor information signal line and a sub-CPU connected to the second indoor board connector, the sub-CPU being configured to transfer, as the thermal-imaging-sensor information representing a thermal image, the thermal information on the air-conditioned room acquired by the thermal imaging sensor to the wireless LAN interface through the thermal-imaging-sensor information signal line.

4. The air-conditioning apparatus of claim 3, further comprising:
a wireless LAN interface board including thereon the interface board connector and the wireless LAN interface,
wherein the operation information signal line and the thermal-imaging-sensor information signal line are sheathed in a bifurcated cable.

5. The air-conditioning apparatus of claim 2,
wherein the thermal-imaging-sensor information is transferred from the indoor board to the wireless LAN interface through the thermal-imaging-sensor information signal line by using a serial peripheral interface (SPI) communication method, and wherein the operation information is transferred from the indoor board to the wireless LAN interface through the operation information signal line by using a communication method whose communication speed is lower than that of the SPI communication method.

6. The air-conditioning apparatus of claim 1, wherein the wireless LAN communication unit is incorporated in an indoor unit of the air-conditioning apparatus.

* * * * *